(12) United States Patent
Pincemin

(10) Patent No.: US 11,874,059 B2
(45) Date of Patent: Jan. 16, 2024

(54) GRAIN DRYING SYSTEM WITH AIR INJECTION AND EXTRACTION

(71) Applicant: Dwayne Pincemin, Smiley (CA)

(72) Inventor: Dwayne Pincemin, Smiley (CA)

( * ) Notice: Subject to any disclaimer, the term of this patent is extended or adjusted under 35 U.S.C. 154(b) by 218 days.

(21) Appl. No.: 17/404,837

(22) Filed: Aug. 17, 2021

(65) Prior Publication Data

US 2023/0059285 A1  Feb. 23, 2023

(51) Int. Cl.
| | | |
|---|---|---|
| *A23B 9/08* | (2006.01) | |
| *F26B 17/14* | (2006.01) | |
| *F26B 17/12* | (2006.01) | |
| *F26B 9/06* | (2006.01) | |

(52) U.S. Cl.
CPC ............ *F26B 17/1416* (2013.01); *A23B 9/08* (2013.01); *F26B 9/063* (2013.01); *F26B 17/122* (2013.01); *F26B 2200/06* (2013.01)

(58) Field of Classification Search
CPC .... F26B 17/1416; F26B 9/063; F26B 17/122; F26B 2200/06; A23B 9/08
USPC .......................................................... 34/168
See application file for complete search history.

(56) References Cited

U.S. PATENT DOCUMENTS

| | | | | |
|---|---|---|---|---|
| 2,655,734 | A | * | 10/1953 | Ohlheiser ............... F26B 9/063 34/174 |
| 5,884,416 | A | * | 3/1999 | Anderson ............... F26B 17/16 34/169 |
| 6,202,319 | B1 | * | 3/2001 | Bening .................. F26B 17/122 34/168 |
| 8,468,716 | B1 | * | 6/2013 | Walker .................. E04B 1/7092 34/235 |
| 9,832,933 | B2 | * | 12/2017 | Thiessen .................. A01F 25/22 |
| 2006/0123655 | A1 | * | 6/2006 | Valfiorani ............. F26B 17/126 34/443 |
| 2006/0130357 | A1 | * | 6/2006 | Long, Jr. .................. F26B 17/20 34/503 |
| 2014/0360045 | A1 | * | 12/2014 | Bartosik .................. F26B 21/08 34/474 |
| 2019/0174782 | A1 | * | 6/2019 | Valfiorani ............... F26B 23/02 |
| 2021/0055051 | A1 | * | 2/2021 | Zheng ................... F26B 21/006 |
| 2022/0170696 | A1 | * | 6/2022 | Rogoschewsky ......... F26B 3/06 |
| 2022/0228805 | A1 | * | 7/2022 | Jolly ....................... F26B 21/10 |

* cited by examiner

*Primary Examiner* — John P McCormack
(74) *Attorney, Agent, or Firm* — Spencer Fane, LLP

(57) ABSTRACT

A system for drying grain in a storage bin, having an air injector for injecting external air into the bin interior to displace moist warm air toward an air extractor and the air extractor for extracting moist warm air from the bin interior and directing it outside the bin.

5 Claims, 5 Drawing Sheets

GRAIN DRYING SYSTEM WITH AIR INJECTION AND EXTRACTION

TECHNICAL FIELD OF THE INVENTION

The present invention relates to systems and methods for drying agricultural products such as grain.

BACKGROUND OF THE INVENTION

In the agricultural arts, it is known that grain can be harvested after it has matured but before the moisture content falls to a level required at point of sale; for example grain can be harvested with up to 20% moisture. Such grain must then be dried to reduce the moisture content to a required level, such as for example 14.5%. If the grain is instead left in the field to dry naturally before harvesting, sprouting or bleaching can result in reduction in crop grade and thus loss of value. Leaving the crop in the field to dry also risks exposing the crop to rain which may not allow time for the grain to dry and be harvested before winter, and crops can be lost.

To address both the desirability of earlier harvest activity and the unpredictability of the weather for crops in place, it is known to store grain after harvest, which storage generally takes place in one or more centrally-located grain bins. The grain can be stored for weeks or even months until it is removed from the bins for transport and processing.

However, it is known that stored grain can become subject to spoilage due to the elevated heat and humidity that can occur within the bin, including from the moisture naturally present in the harvested grain. Various methods have been proposed for managing the heat and humidity within grain bins and for maintaining grain in a relatively dry condition, with varying degrees of effectiveness and sometimes representing labor-intensive and/or cost-prohibitive solutions. Airflow rate within the bin is known to impact drying of grain, but some prior art solutions that push moist warm air in the grain upwardly through the bin may struggle to achieve the force necessary to move the heavy air toward the top of the bin and thus sometimes leave significant moisture in the upper layers of the grain.

SUMMARY OF THE INVENTION

According to a first broad aspect of the present invention, there is provided a system for drying grain housed in a storage bin, the storage bin having a peripheral wall defining an interior space, the system comprising: an air injector configured to inject dry external air at least halfway across the interior space; and an air extractor configured to extract moist warm internal air from at least halfway across the interior space; one of the air injector and the air extractor positioned centrally within the interior space, and the other of the air injector and the air extractor positioned adjacent the peripheral wall in the interior space; such that the air injector injects the dry external air through the grain at least halfway across the interior space toward the air extractor, and the air extractor extracts moist warm internal air through the grain from at least halfway across the interior space from the air injector.

Unlike some prior art systems in which a single high-power device must operate alone at a level sufficient to extract moist warm air from an entire bin interior, embodiments according to the present invention may require less power shared between two devices such as an injection pump and an extraction pump which each only need to be effective across half the distance between the injector and extractor.

In some exemplary embodiments of the first broad aspect of the present invention, the air extractor is positioned centrally within the interior space and the air injector is positioned adjacent the peripheral wall in the interior space. In some such embodiments, the air injector may comprise a plurality of air injectors spaced around the peripheral wall, the plurality of air injectors disposed to direct the dry external air through the grain toward the air extractor.

The air extractor is preferably provided with an outlet line to outside the bin and an air extraction pump configured to pull the moist warm internal air through the air extractor and the outlet line. The air injector is likewise preferably provided with an intake line and an air injection pump configured to force the dry external air through the intake line and the air injector into the interior space.

The air extractor preferably extends upwardly through the interior space from a base of the bin, and in some exemplary embodiments comprises an elongate tube composed of perforated steel.

The air injector is preferably mounted on an interior surface of the peripheral wall and may comprise an elongate tube composed of perforated steel. In embodiments with a plurality of air injectors each one may comprise an elongate tube composed of perforated steel. In some embodiments the bin comprises a plurality of bin legs and each of the plurality of air injectors are integral with one of the plurality of bin legs. The external air may be fed to the air injector by a flexible hose, or the bin may comprise a hollow bin floor and the dry external air is fed to the air injector through the hollow bin floor, while in other embodiments the bin may comprise a hollow peripheral passage and the dry external air is fed to the air injector through the hollow peripheral passage.

In embodiments where the bin is a hopper-bottom bin, the system preferably further comprises a frame disposed above a bottom of the bin, the frame configured to support the air extractor above the bottom of the bin while allowing the grain to pass around the frame toward the bottom of the bin.

In embodiments where the air extractor is provided with an air extraction pump configured to pull the moist warm internal air through the air extractor, and the air injector is provided with an air injection pump configured to force the dry external air through the air injector into the interior space, systems may further comprise sensors for sensing at least one of heat and moisture within the interior space. The sensors may then be configured to send a notification signal when the at least one of the heat and the moisture within the interior space exceeds a set threshold. Alternatively, the sensors may be configured to send an activation signal to activate the air injection pump and the air extraction pump when the at least one of the heat and the moisture within the interior space exceed an upper set threshold, and to send a deactivation signal to the air injection pump and the air extraction pump when the at least one of the heat and the moisture within the interior space falls below a lower set threshold.

In some other embodiments of the first aspect, a heat exchanger may be incorporated for capturing heat from the moist warm internal air extracted from the bin and applying the heat to the dry external air such that the dry external air is heated prior to being injected into the interior space.

According to a second broad aspect of the present invention, there is provided a system for drying grain housed in a storage bin by removing moist air from the bin, the system comprising: a plurality of peripherally-disposed air injectors spaced around the storage bin to inject external air towards a centre of the interior space and displace the moist air; and an air extractor positioned centrally within the bin to extract the moist air.

In some embodiments of the second aspect, the plurality of air injectors are provided with an air injection pump to force the external air toward the air extractor, and the air extractor is provided with an air extraction pump to pull the moist air through the air extractor.

Sensors may also be incorporated in some exemplary embodiments for sensing at least one of heat and moisture within the bin. The sensors may be configured to send a notification signal when the at least one of the heat and the moisture within the bin exceeds a set threshold. Alternatively, the sensors may be configured to send an activation signal to activate the air injection pump and the air extraction pump when the at least one of the heat and the moisture within the bin exceed an upper set threshold, and to send a deactivation signal to the air injection pump and the air extraction pump when the at least one of the heat and the moisture within the bin falls below a lower set threshold.

A heat exchanger may be incorporated into embodiments of the second aspect for capturing heat from the moist air extracted from the bin and applying the heat to the external air such that the external air is heated prior to being injected into the bin.

A detailed description of exemplary embodiments of the present invention is given in the following. It is to be understood, however, that the invention is not to be construed as being limited to these embodiments. The exemplary embodiments are directed to particular applications of the present invention, while it will be clear to those skilled in the art that the present invention has applicability beyond the exemplary embodiments set forth herein.

BRIEF DESCRIPTION OF THE DRAWINGS

In the accompanying drawings, which illustrate exemplary embodiments of the present invention.

Exemplary embodiments will now be described with reference to the accompanying drawings.

DETAILED DESCRIPTION OF EXEMPLARY EMBODIMENTS

Throughout the following description, specific details are set forth in order to provide a more thorough understanding to persons skilled in the art. However, well known elements may not have been shown or described in detail to avoid unnecessarily obscuring the disclosure, for example conventional pumps or fans that the skilled person would readily be able to select and implement. The following description of examples of the invention is not intended to be exhaustive or to limit the invention to the precise form of any exemplary embodiment. Accordingly, the description and drawings are to be regarded in an illustrative, rather than a restrictive, sense.

The present invention is directed to a system for drying grain in a storage bin or for maintaining a desired level of heat and humidity within the bin so as to reduce the risk of grain spoilage during storage. While some embodiments of the present invention may be directed to retrofits of existing bins, some other embodiments may be new bin construction with the system components incorporated therein.

The present invention is directed to a system comprising an air injector and an air extractor, wherein the air injector operates to force external air into the bin and the air extractor pulls the moist warm air out of the bin and directs it to outside the bin. Preferably the injector and extractor operate at the same time, such that the injector is displacing moist warm air toward the extractor at the same time that the extractor is pulling moist warm air toward itself for removal, in such a way that the potentially dryer and cooler external air is moved into the inter-grain spaces within the bin interior. As each of the injector and extractor only need to be strong enough to move air halfway between the injector and extractor, this may reduce size and power requirements for the machinery such as pumps or fans that may be used to actuate the air injection and extraction.

Note that while the illustrated embodiments show peripheral air injectors and a centrally-disposed air extractor, those skilled in the art will be able to see that peripheral extractors can be used with a centrally-disposed injector instead with appropriate modifications to operations conditions for the pumps or fans being employed.

Figure 1:
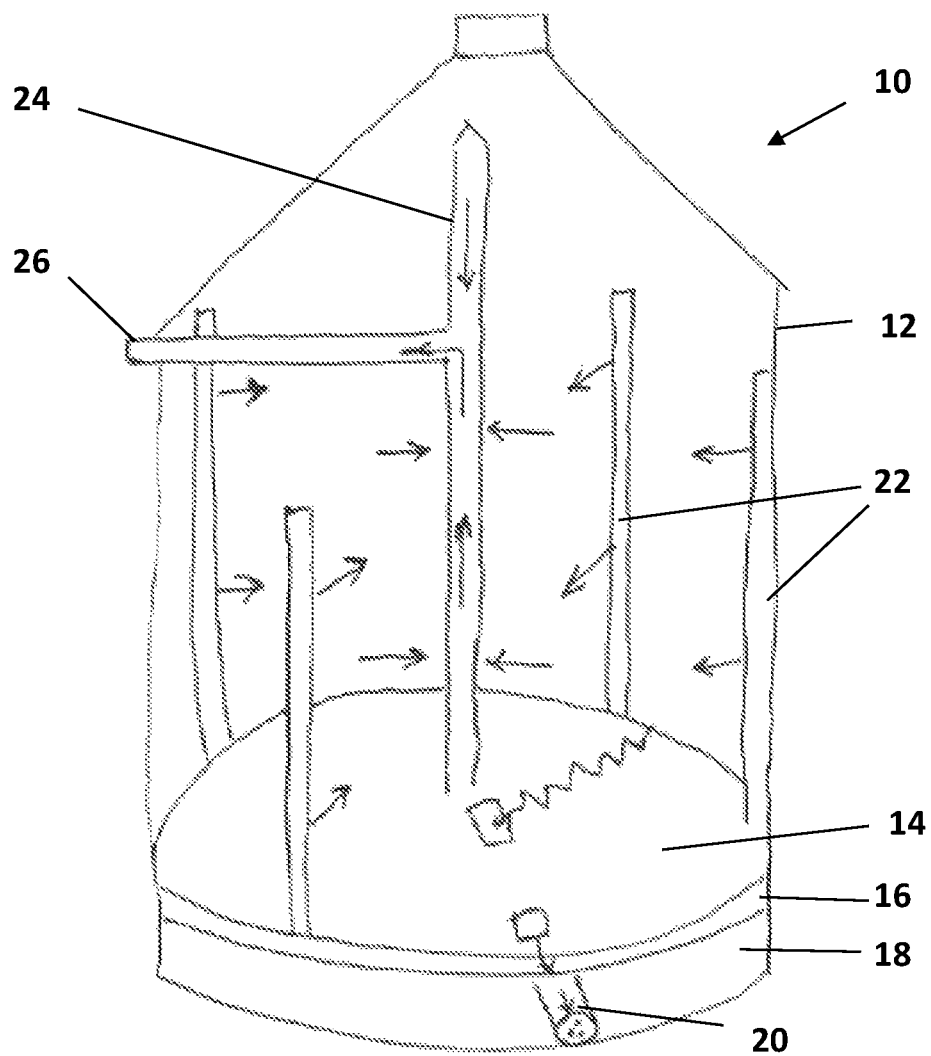
FIG. 1 is a side perspective view of a bin interior according to a first exemplary embodiment of the present invention.

Turning now to FIG. 1, a first embodiment of the present invention is illustrated. In this embodiment, a bin 10 comprises a peripheral wall 12 around which a plurality of air injectors 22 are mounted. In this embodiment, the bin 10 comprises a false floor 14 which provides a flat bottom surface for the bin 10 interior. The false floor 14 is spaced above the cement floor footing 18, such that a space 16 is formed between the false floor 14 and the cement floor 18, with a centre unload auger 20 positioned in the space 16 for removing grain from the bin. The space 16 can thereby serve as a passage for external air pumped into the space 16 can be directed to the injectors 22. The embodiment also comprises a single centrally-disposed air extractor 24 which is used to remove moist warm air from the bin 10 interior.

Both the injectors 22 and the extractor 24 may comprise perforated steel mesh, the mesh size selected to allow air passage while disallowing grain to move into the interiors of the injectors 22 and the extractor 24. The mesh size will therefore depend to an extent on the size of the grain stored in the bin 10, but also on the power of the pump or fan being used to actuate the air injection and extraction. The injectors 22 would be fed external air through an inlet line (not shown) powered by a pump or fan (not shown). The extractor 24 connects to an outlet line 26, which would be fitted with a pump or fan (not shown in FIG. 1) to pull the moist warm air through the extractor 24 and the outlet line 26.

Figure 2:
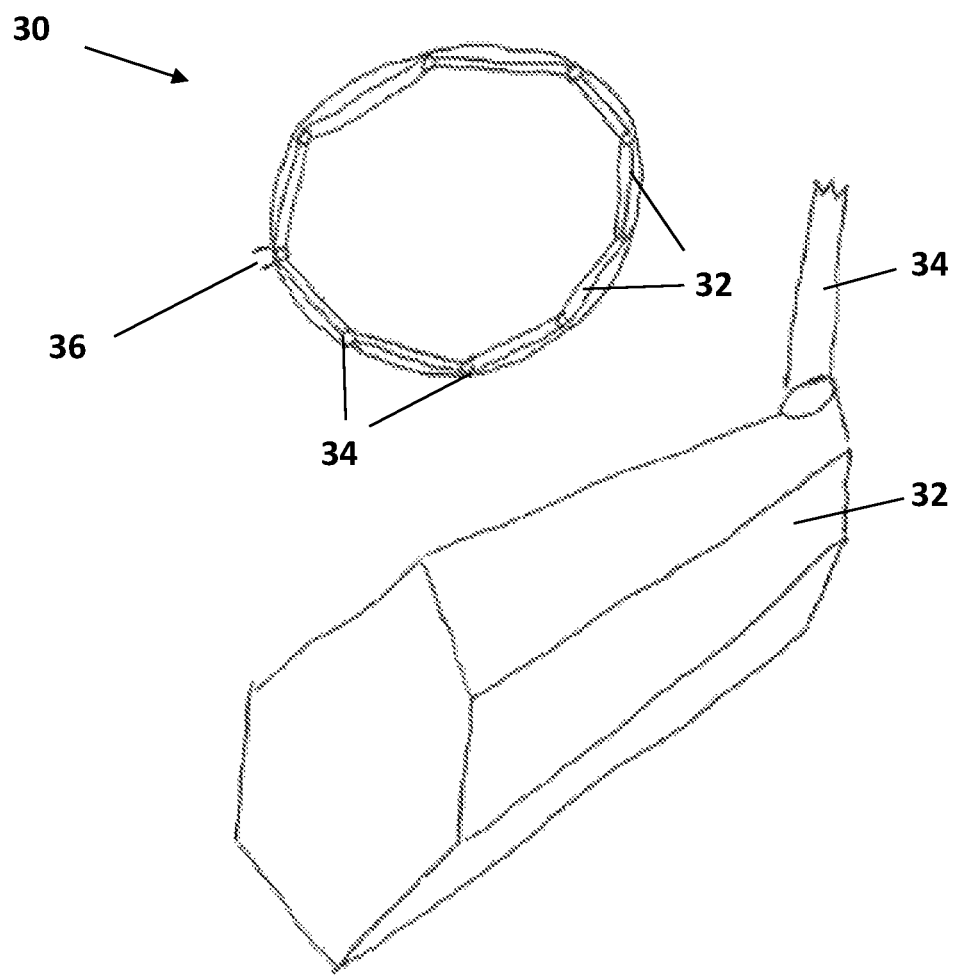
FIG. 2 is a detailed view of an exemplary peripheral external air feed structure.

FIG. 2 illustrates an external air feed structure that can be used with certain embodiments of the present invention. The peripheral feed structure 30 could be used instead of or in addition to a hollow below-bin space such as that illustrated in FIG. 1. The structure 30 comprises hollow sections 32 in a ring structure, with connection to each of the air injectors 34 at the junctions of the hollow sections 32. The hollow sections 32 are preferably bolted or otherwise secured to the peripheral wall of the bin, and one of the hollow sections 32 is connected to an inlet line and pump/fan 32 to receive external air, which external air is forced through the hollow sections 32 to the injectors 34 and thus into the bin interior to displace moist warm air therein.

Figure 3:
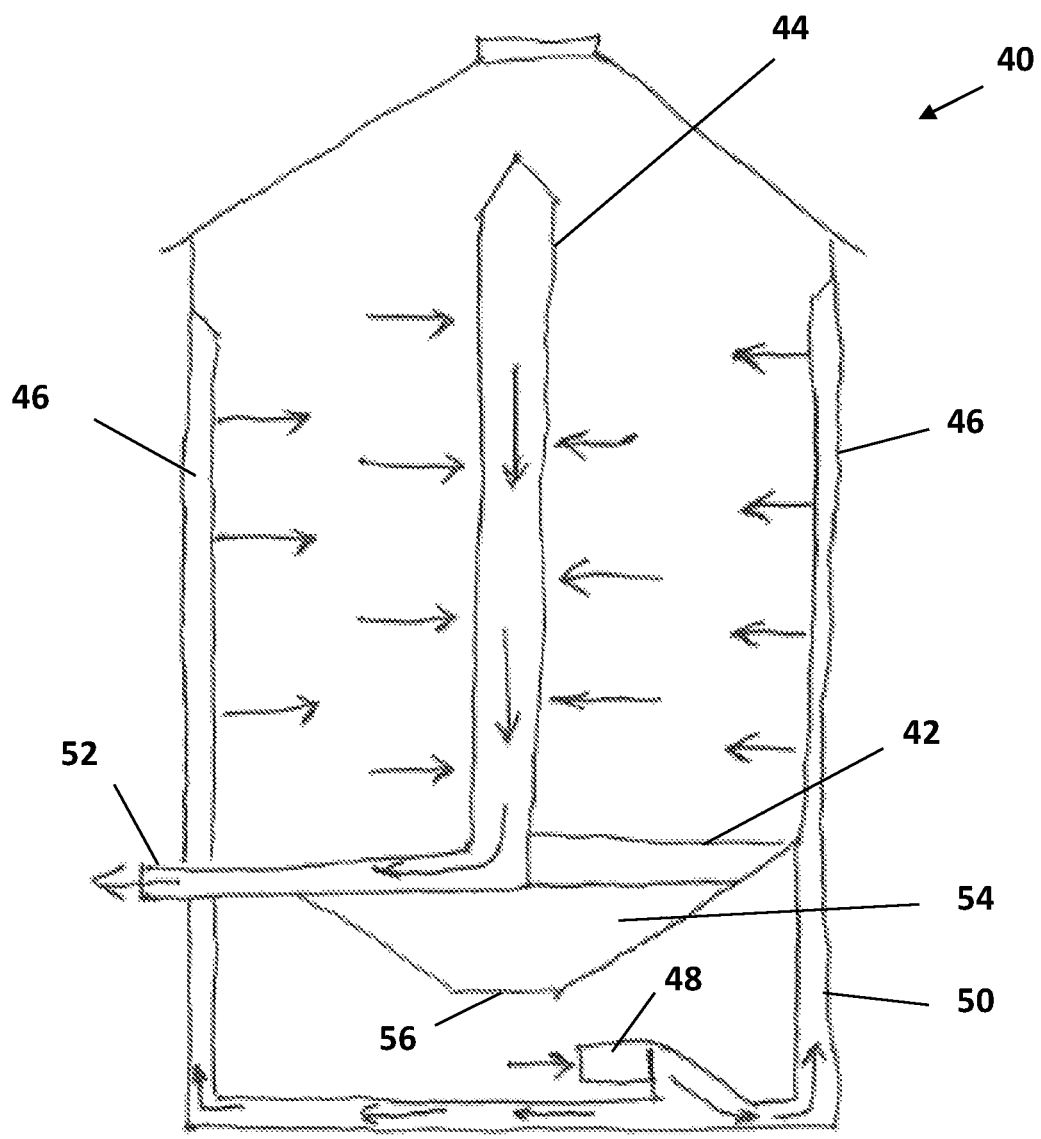
FIG. 3 is a side elevation view of a bin interior according to a second exemplary embodiment of the present invention.

FIG. 3 illustrates another embodiment of the present invention, a hopper-bottom bin 40. As the bin 40 conventionally releases stored grain through a door 56 in the bottom 54 of the bin 40, the extractor 44 is supported by a frame 42 located near the bottom of the bin 40 to allow grain to pass around the frame 42 while preventing the extractor 44 from being pulled downwardly toward the door 56. A pump/fan (not shown) would pull moist warm air through the extractor 44 and an outlet line 52. In this embodiment, the bin 40 is provided with a hollow base 50 to feed dryer, cooler external air to the injectors 46. A pump/fan 48 pulls the external air into the base 50 and drives it towards the injectors 46 for injection into the bin interior, thus displacing moist warm air toward the extractor 44 for removal.

Figure 4:
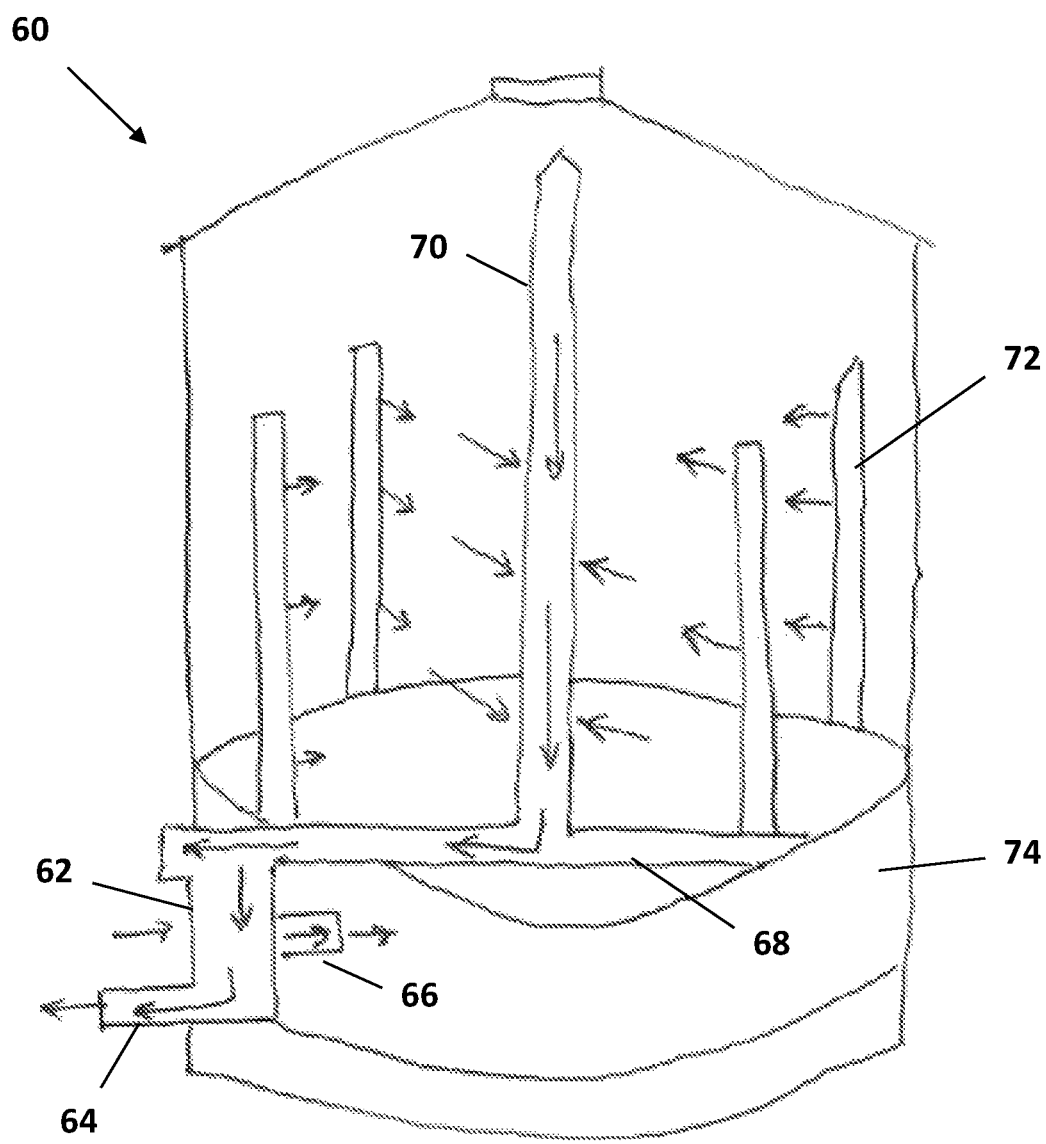
FIG. 4 is a side perspective view of a bin interior according to a third exemplary embodiment of the present invention.

As there are potential benefits to having the external air dry but also heated, the embodiment of FIG. 4 illustrates the use of a heat exchanger 62. The bin 60 is provided with a plurality of air injectors 72 spaced around the periphery of the bin 60 interior, with a centrally-disposed air extractor 70. The extractor 70 is again supported by a frame 68 as this is a hopper-bottom bin design, and the bottom of the bin 60 is an open but confined space 74 to allow for the feeding of external air to the injectors 72. As moist warm air is drawn out of the bin 60 interior by a pump/fan (not shown) through the extractor 70 and an outlet line 64, the outlet line 64 passes through the heat exchanger 62 where the heat exchanger 62 allows for heat from the outgoing moist warm air to contact or otherwise pass to an inlet line 66 that feeds external air into the hollow space 74 and the injectors 72. While the external air drawn into the inlet line 66 would be at ambient temperature, passage through the heat exchanger 62 would elevate the temperature of the external air in the inlet line 66 and thus aid in maintaining a desirable heat/humidity level within the bin.

Figure 5:
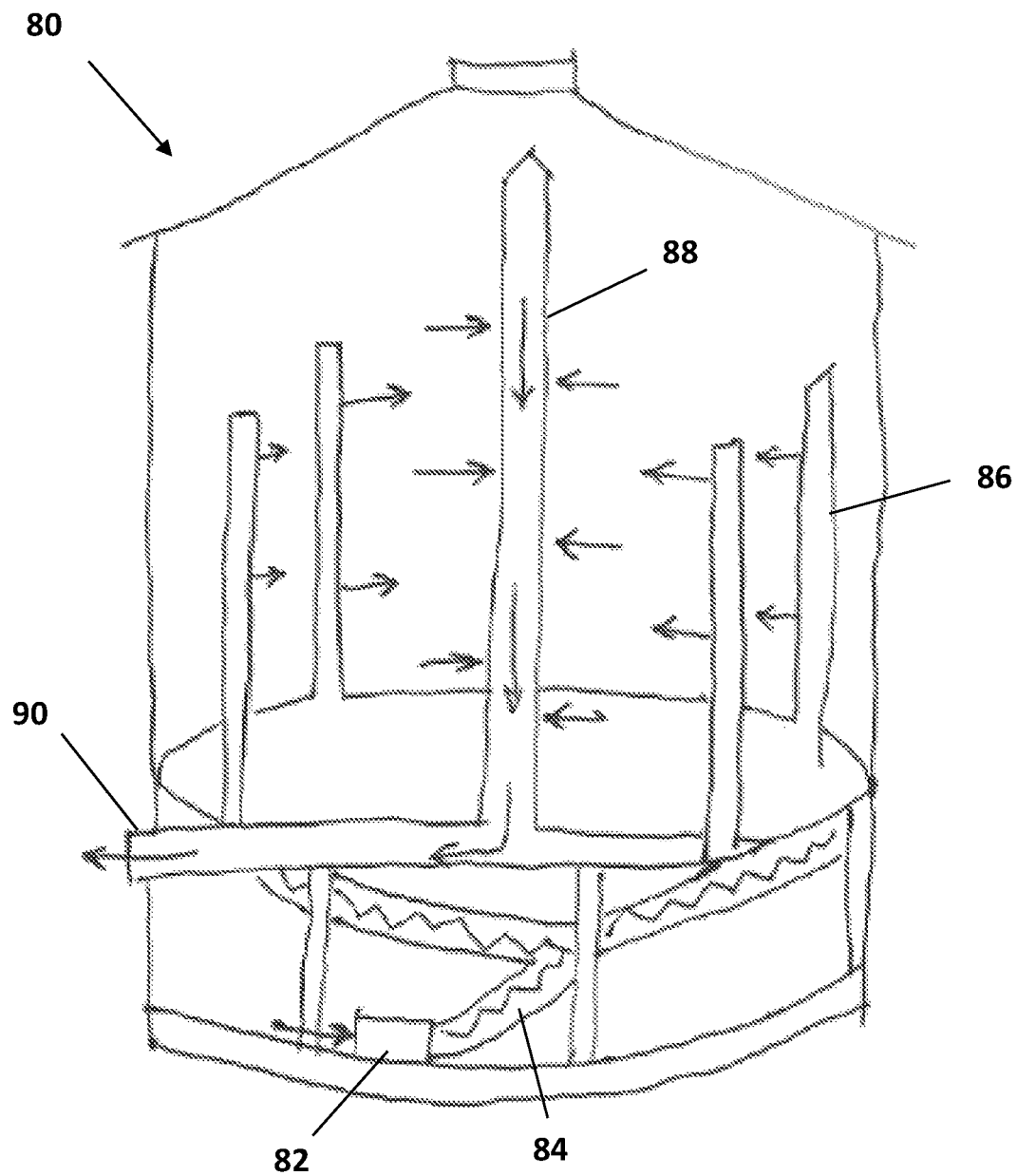
FIG. 5 is a side perspective view of a bin interior according to a fourth exemplary embodiment of the present invention.

FIG. 5 illustrates another embodiment of the present invention. In this embodiment, a hopper-bottom bin 80 comprises peripheral air injectors 86 and a centrally-disposed air extractor 88. A pump/fan 82 forces external air into a hose 84, in this embodiment a rubberized hose with fittings to connect to the injectors 86 to supply them with the external air. The moist warm air is again drawn through the extractor 88 and through an outlet line 90 to the outside.

In some embodiments of the present invention, sensors may be installed in the bin in a manner known to those skilled in the art for detecting heat and humidity levels in the bin interior. As it is desirable to maintain heat and humidity levels below a certain threshold, such sensors could be used to detect when heat and/or humidity levels exceeded a threshold. At that point, a notification could be sent to the operator advising that the threshold had been exceeded, and the operator could manually activate the pumps/fans for the injectors and extractors to bring the heat and/or humidity levels below the threshold. Alternatively, the pumps/fans could be provided with a controller configured for receipt of a signal when the threshold is exceeded, upon receipt of which signal the pumps/fans would automatically activate to bring the heat and/or humidity levels below the threshold. A lower threshold value could also be set, at which the pumps/fans would receive another signal and automatically shut down. Such sensor arrangements are optional but beneficial and their design and operation would be within the knowledge of the skilled person.

The foregoing is considered as illustrative only of the principles of the present invention. The scope of the claims should not be limited by the exemplary embodiments set forth in the foregoing, but should be given the broadest interpretation consistent with the specification as a whole.

The invention claimed is:

1. A system for drying grain housed in a storage bin by removing moist air from the storage bin, the storage bin defining an interior space therein, the system comprising:
   a plurality of peripherally-disposed air injectors spaced around the storage bin to inject external air towards a center of the interior space and displace the moist air; and
   an air extractor positioned centrally within the storage bin to extract the moist air, with a distance between each of the air injectors and the air extractor;
   each of the air injectors configured to inject the external air towards the air extractor to about half of the distance between the air injector and the air extractor;
   the air extractor configured to pull the moist air away from each of the air injectors from about half of the distance between the air extractor and the air injector;
   wherein the air extractor is provided with an outlet line to outside the storage bin and an air extraction pump configured to pull the moist air through the air extractor and the outlet line; and
   wherein the plurality of air injectors is provided with an intake line and an air injection pump configured to force the external air through the intake line and the plurality of air injectors into the interior space.

2. The system of claim 1 further comprising sensors for sensing at least one of heat and moisture within the storage bin.

3. The system of claim 2 wherein the sensors are configured to send a notification signal when the at least one of the heat and the moisture within the storage bin exceeds a set threshold.

4. The system of claim 2 wherein the sensors are configured to send an activation signal to activate the air injection pump and the air extraction pump when the at least one of the heat and the moisture within the storage bin exceed an upper set threshold, and to send a deactivation signal to the air injection pump and the air extraction pump when the at least one of the heat and the moisture within the storage bin falls below a lower set threshold.

5. The system of claim 1 further comprising a heat exchanger for capturing heat from the moist air extracted from the storage bin and applying the heat to the external air such that the external air is heated prior to being injected into the storage bin.

* * * * *